US008779072B2

(12) United States Patent
Iijima et al.

(10) Patent No.: US 8,779,072 B2
(45) Date of Patent: *Jul. 15, 2014

(54) HEAT-CURABLE SILICONE RUBBER COMPOSITION

(75) Inventors: Hiroyoshi Iijima, Tokyo (JP); Hideo Takahashi, Tokyo (JP)

(73) Assignee: Momentive Performance Materials Japan LLC, Tokyo (JP)

( * ) Notice: Subject to any disclaimer, the term of this patent is extended or adjusted under 35 U.S.C. 154(b) by 105 days.

This patent is subject to a terminal disclaimer.

(21) Appl. No.: 12/735,083

(22) PCT Filed: Dec. 26, 2008

(86) PCT No.: PCT/JP2008/073962
§ 371 (c)(1),
(2), (4) Date: Jun. 14, 2010

(87) PCT Pub. No.: WO2009/084730
PCT Pub. Date: Jul. 9, 2009

(65) Prior Publication Data
US 2011/0039991 A1 Feb. 17, 2011

(30) Foreign Application Priority Data

Dec. 27, 2007 (JP) .................................. 2007-335683

(51) Int. Cl.
| | |
|---|---|
| *C08L 83/04* | (2006.01) |
| *C08K 5/19* | (2006.01) |
| *C08K 5/42* | (2006.01) |
| *C08K 5/43* | (2006.01) |
| *C08G 77/04* | (2006.01) |
| *C08G 77/24* | (2006.01) |
| *C08G 77/06* | (2006.01) |
| *C08G 77/20* | (2006.01) |

(52) U.S. Cl.
CPC ............... *C08G 77/04* (2013.01); *C08G 77/24* (2013.01); *C08K 5/43* (2013.01); *C08L 83/04* (2013.01); *C08G 77/06* (2013.01); *C08G 77/20* (2013.01)
USPC ........................................................ 525/474

(58) Field of Classification Search
CPC ....................................................... C08L 83/04
USPC ........................................................ 525/474
See application file for complete search history.

(56) References Cited

U.S. PATENT DOCUMENTS

| | | | | |
|---|---|---|---|---|
| 4,144,206 | A | | 3/1979 | Symeon |
| 5,827,602 | A | * | 10/1998 | Koch et al. .................... 429/328 |
| 8,030,378 | B2 | * | 10/2011 | Iijima .............................. 524/99 |
| 2004/0014925 | A1 | * | 1/2004 | Hell et al. ........................ 528/31 |
| 2006/0058452 | A1 | | 3/2006 | Sakamoto et al. |
| 2010/0267979 | A1 | * | 10/2010 | Bauer et al. .................... 556/479 |
| 2012/0148519 | A1 | * | 6/2012 | Satake ........................ 424/78.04 |
| 2013/0142548 | A1 | * | 6/2013 | Suzuki et al. ................. 399/286 |

FOREIGN PATENT DOCUMENTS

| | | | |
|---|---|---|---|
| JP | 62-15584 | | 8/1979 |
| JP | 2002-146178 | | 5/2002 |
| JP | 2003-519281 | | 6/2003 |
| JP | 2004-331738 | | 11/2004 |
| JP | 2004346291 A | * | 12/2004 |
| JP | 2005-298661 | | 10/2005 |
| JP | 2005-344102 | | 12/2005 |
| JP | 2005-350579 | | 12/2005 |
| JP | 2005347068 A | * | 12/2005 |
| JP | 2006-83211 | | 3/2006 |
| JP | A 2006-070120 | | 3/2006 |
| JP | 2006-225422 | | 8/2006 |
| JP | 2006-321855 | | 11/2006 |
| JP | 2007070399 A | * | 3/2007 |
| JP | 2007-321115 | | 12/2007 |
| JP | 2008156430 A | * | 7/2008 |
| JP | 2008-222902 | | 9/2008 |
| JP | 2008-231437 | | 10/2008 |
| WO | WO 01/49925 A1 | | 7/2001 |
| WO | WO 2007/108659 A1 | | 9/2007 |

OTHER PUBLICATIONS

Weyer et al. B. Weyershausen, K. Hell, U. Hesse, Green. Chem., 2005, 7, 283.*
Machine translation of Norifusa et al (JP 2004346291).*
Machine translation of Ikeno et al (JP 2005344102).*
Machine translation of Fujihana et al (JP 2005-350579).*
Machine translation of Kamei et al (JP 2007-321115).*
Machine Translation of JP 2006-225422.*
List of Category Information in cited documents (1 page).
European Search Report dated Mar. 21, 2012 (4 pages).

* cited by examiner

*Primary Examiner* — Mike M Dollinger
(74) *Attorney, Agent, or Firm* — Flynn, Thiel, Boutell & Tanis, P.C.

(57) ABSTRACT

The present invention provides a heat-curable silicone rubber composition having antistatic properties, even after secondary vulcanization at high temperatures. Specifically disclosed is a heat-curable silicone rubber composition which is obtained by adding 0.05 to 1000 ppm of (B) a poorly water-soluble or water-insoluble ionic substance whose anionic component is bis(trifluoromethanesulfonyl)imide, to 100 parts by weight of (A) a heat-curable silicone rubber.

9 Claims, No Drawings

HEAT-CURABLE SILICONE RUBBER COMPOSITION

TECHNICAL FIELD

The present invention relates to a heat-curable silicone rubber composition having high antistatic properties.

TECHNICAL FIELD

Hitherto, antistatic rubber compositions using a polyether-based compound as an antistatic agent have been proposed (JP-B 62-15584). The compositions using the polyether compound, however, have a problem that the cured products thereof have a white turbidity because of a poor compatibility between the silicone polymer and the polyether-based antistatic agent. Therefore, it is difficult to use the composition as covers for portable music players, portable game machines, cell phones and controllers of game machines; silicone rubber molds used for producing duplicates by using a urethane resin; and silicone rubber materials used for coating a cloth with the silicone rubber, all of which require a higher transparency in the use thereof. The compositions using the polyether compound also have a problem that the polyether compound thermally decomposes at high temperatures and, thus, sufficient antistatic effects cannot be exhibited. In addition, the heat-curable silicone rubber cures in a secondary vulcanization step, for example, for 4 hours at 200° C. after primary curing, in order to further accelerate the removal of decomposed products of the curing agent or the curing. It has been proposed that a lithium salt is blended as shown in JP-A 2006-225422 as a technique exhibiting high heat resistance. The lithium salt is in the state of a solid or powder. It is important for antistatic products to exhibit antistatic effects on their surfaces, but the solid substance has drawbacks in that it takes time until it exhibits the effect. Furthermore, the lithium salt has quality drawbacks such that differences easily occur in the dispersion state and that it is difficult to obtain a stable quality.

On the other hand, it has been proposed numerous times to add an ionic liquid to a rubber-plastic composition. For example, JP-A2005-298661 and JP-A2006-83211 propose examples of the addition thereof to a silicone rubber. However, a dimethyl silicone polymer is originally non-polar and has a low solubility constant (SP value) of 14.9 $(MPa)^{1/2}$, and thus has a very low compatibility with the ionic liquid which has a high compatibility with a polymer having a high SP value such as urethane, epichlorohydrin, acrylonitrile butadiene or chloroprene. It is difficult therefore to stably add the ionic liquid to the silicone rubber, and even if the ionic liquid is added to the rubber, much of it bleeds immediately on the surface of the rubber, and the effect cannot be maintained. Further, the addition of the ionic liquid to the silicone rubber, in the proposals described above, is not the addition to the heat-curable silicone rubber as discussed in the present invention, but mainly to a condensation-curing polymer which is curable at room temperature, and therefore the addition amount and the object are different from those of the invention. Furthermore, the publications do not describe the improvement of the compatibility, as shown in the present invention. Moreover, the combined use of other components is indispensable, and the ionic liquid is not added alone.

Although there is an example in which an ionic liquid is added to a heat-curable silicone rubber (JP-A 2005-344102), in this method, combination with a polyether-modified organohydrogenpolysiloxane is essential, and not only is the reaction limited to addition reactions, but also the kind of ionic liquid which has a good compatibility with the silicon polymer is not shown, though it is said that the silicone polymer has more than 1000 kinds; that is, the publication lacks detail or specifics. In addition, the publication neither suggests that a specific ionic liquid can produce the effect of the present invention in extremely small amounts, nor suggests the compatibility. Furthermore, a large amount of the ionic liquid is used, and thus it is not suitable for commercial use, even though an expensive ionic liquid is used.

DISCLOSURE OF THE INVENTION

The present invention aims at solving the problems of the conventional technique and providing a heat-curable silicone rubber composition having antistatic properties, even after secondary vulcanization at high temperatures and is capable of stably imparting antistatic properties to a silicone polymer having a poor compatibility with anionic substance for an extended period of time.

The present inventors have conducted detailed studies for achieving the above purpose through a relatively simple method. As a result, they have found that the addition of specifically small amounts of a specific ionic substance relative to a heat-curable silicone rubber is very effective in achieving the above purpose, and have completed the present invention.

That is, the present invention relates to a heat-curable silicone rubber composition, prepared by adding 0.05 to 1000 ppm of (B) a poorly water-soluble or water-insoluble ionic substance whose anionic component is bis(trifluoromethanesulfonyl)imide, to 100 parts by weight of (A) a heat-curable silicone rubber.

According to the present invention, a heat-curable silicone rubber composition having high antistatic properties can be obtained even after secondary vulcanization at high temperatures and, further, a heat-curable silicone rubber composition capable of stably imparting antistatic properties to a silicone polymer having poor compatibility with an ionic substance for an extended period of time can be provided. When an ionic liquid is used as the ionic substance, the surface potential is rapidly decreased, whereby the effect can be exhibited faster than that of solid lithium salts, and the addition amount can be smaller than that of solid ionic substances, and an effect that a semi-transparent appearance peculiar to the silicone rubber can be maintained (in particular, no yellow discoloration) is exhibited.

DETAILED DESCRIPTION OF THE INVENTION

The present invention will be described in detail below. The heat-curable silicone rubber, which is the component (A), is made up of a polyorganosiloxane base polymer, a curing agent, and various known additives such as fillers used if necessary. As the polyorganosiloxane base polymer, usually widely known ones can be used. An organic group in the polyorganosiloxane base polymer is a substituted or unsubstituted monovalent hydrocarbon group, and may include unsubstituted hydrocarbon groups, for example, alkyl groups such as a methyl group, ethyl group, propyl group, butyl group, hexyl group or dodecyl group, aryl groups such as a phenyl group, and aralkyl groups such as a β-phenylethyl group or β-phenylpropyl group; and substituted hydrocarbon groups such as a chloromethyl group or 3,3,3-trifluoropropyl group. The methyl group is generally often used because of ease of synthesis, and the like. In particular, polydiorganosiloxanes in which at least two organic groups of the organic groups bound to silicon atom in one molecule are vinyl groups are common, and linear ones are particularly preferably used. The polyorganosiloxane, however, is not limited thereto, and the use of, partially, polyorganosiloxanes having no vinyl group, or branched or cyclic polyorganosiloxanes is possible.

Furthermore, the heat-curable silicone rubber of the invention can be obtained by utilizing a curing mechanism of known silicone rubbers, and the curing is generally performed by cross-linking with an organic peroxide or cross-linking through addition reaction.

Commercially available organic peroxides can be used as a curing agent used in the cross-linking with the organic peroxide, and various kinds of organic peroxide vulcanizing agents such as benzoyl peroxide, 2,4-dichlorobenzoyl peroxide, p-methylbenzoyl peroxide, o-methylbenzoyl peroxide, dicumyl peroxide, cumyl-t-butyl peroxide, 2,5-dimethyl-2,5-di-t-butyl peroxyhexane or di-t-butyl peroxide are used. In particular, dicumyl peroxide, cumyl-t-butyl peroxide, 2,5-dimethyl-2,5-di-t-butyl peroxyhexane, and di-t-butyl peroxide are preferable, because they give low permanent compressive strain.

These organic peroxide vulcanizing agents can be used alone or as a mixture of two or more kinds. The blending amount of the organic peroxide as the curing agent is generally within a range of 0.05 to 10 parts by weight relative to 100 parts by weight of the silicone base polymer.

On the other hand, with respect to a curing agent used when the cross-linking through addition reaction is adopted, as a curing catalyst, a platinum catalyst such as chloroplatinic acid, platinum olefin complex, platinum vinyl siloxane complex, platinum black or platinum triphenylphosphine complex is used, and as a cross-linking agent, a polydiorganosiloxane in which the average number of hydrogen atoms bound to silicon atom is more than 2 in one molecule is used. The blending amount of the curing catalyst in the addition reaction curing agent is preferably within a range of 0.1 to 1000 ppm relative to the base polymer in terms of the platinum element amount. When the blending amount of the curing catalyst is less than 0.1 ppm in terms of the platinum element amount, the curing does not sufficiently proceed, whereas even when the amount is more than 1000 ppm, further increase of the curing speed is not especially expected. In addition, the blending amount of the cross-linking agent is preferably such an amount that the number of hydrogen atoms bound to a silicon atom in the cross-linking agent is from 0.5 to 4.0 per alkenyl group in the base polymer, more preferably, such an amount that the number is from 1.0 to 3.0. When the number of the hydrogen atoms is less than 0.5, the curing of the composition does not sufficiently proceed, and thus the hardness of the cured composition becomes lower, whereas when the number of the hydrogen atoms is more than 4.0, the physical properties and the heat resistance of the cured composition deteriorate.

The additives which are blended, if necessary, may include fillers, pigments, heat resistance-improving agents, flame retardants, and the like.

In particular, it is preferable to blend reinforcing silica as the additive. Examples of the reinforcing silica include dry silica such as aerosol silica or arc silica; wet silica such as precipitated silica or silica aerogel; hydrophobic silica which is obtained by treating the silica described above with an organic silicon compound such as hexamethyldisilazane, trimethylchlorosilane, dimethyldichlorosilane, trimethylmethoxysilane or octamethylcyclotetrasiloxane, and the like, and the aerosol silica and the hydrophobized silica thereof are preferable. In order to obtain a high reinforcing effect, reinforcing silica having a specific surface area of typically 50 $m^2/g$ or more, preferably 100 to 700 $m^2/g$, more preferably 130 to 500 $m^2/g$ is used.

The reinforcing silica is blended in an amount of 1 to 100 parts by weight relative to 100 parts by weight of the base polymer. When the amount is less than one part by weight, the reinforcement is not sufficiently improved, whereas when the amount is more than 100 parts by weight, it is difficult to perform blending and the physical properties of the rubber are also affected.

Moreover, examples of other fillers can include pulverized quartz powder, clay, calcium carbonate, diatomaceous earth, titanium dioxide, and the like. Furthermore, examples of the heat resistance-improving agent can include iron oxide, cerium oxide, cerium hydroxide, iron octylate, and the like. In addition, it is possible to blend saturated aliphatic hydrocarbons such as isoparaffins, releasing agents such as metal salts of fatty acids and fatty acid amides, blowing agents such as azodicarbonamide and azobisisobutyronitrile, and the like.

Furthermore, known organic silicon compounds, surfactants or processing aids, which are blended for improving the dispersibility of a filler such as reinforcing silica may be used.

The ionic substance (B) used in the present invention is an ionic substance whose anionic component is bis(trifluoromethanesulfonyl)imide, which is poorly water-soluble or water-insoluble. Among many combinations of an anionic component and an cationic component, particularly, a poorly water-soluble or water-insoluble ionic substance whose anionic component is bis(trifluoromethanesulfonyl)imide is excellent for obtaining the effect intended by the present invention. Preferably, the ionic substance is in the liquid state at ordinary temperatures (23° C.) (a molten salt at ordinary temperatures), and has a decomposition temperature of 220° C. or more. Examples of the ionic substance include 1-butyl-3-methylimidazolium.bis(trifluoromethanesulfonyl)imide, 1,2-dimethyl-3-propylimidazolium.bis(trifluoromethanesulfonyl)imide, 1-ethyl-3-methylimidazolium.bis(trifluoromethanesulfonyl)imide, 3-methyl-1-propyl-pyridinium.bis(trifluoromethanesulfonyl)imide, N-butyl-3-methylpyridinium.bis(trifluoromethanesulfonyl)imide, 1-butyl-1-methylpyrrolidinium-bis(trifluoromethanesulfonyl)imide, and the like, and N-butyl-3-methylpyridinium.bistrifluoromethanesulfonyl)imide and 1-butyl-1-methylpyrrolidiniumbis(trifluoromethanesulfonyl)imide are most preferable.

More preferably, the ionic liquid has at least one alkenyl group as its cationic ion, whereby the ionic liquid having poor compatibility can be kept in the silicone rubber composition system over an extended period of time. Examples of the alkenyl group can include unsaturated aliphatic hydrocarbon groups such as a vinyl group, allyl group, methylvinyl group, propenyl group, butenyl group, pentenyl group or hexenyl group; unsaturated cyclic hydrocarbon groups such as a cyclopropenyl group, cyclobutenyl group, cyclopentenyl group or cyclohexenyl group; methacryl group, and the like. Among these, a vinyl group or allyl is particularly preferable. Examples of such an ionic liquid may include 1-vinylimidazolium.bis-(trifluoromethanesulfonyl)imide, 1-allylimidazolium.bis-(trifluoromethanesulfonyl)imide, 1-allyl-3-methylimidazolium.bis(trifluoromethanesulfonyl)imide, diallyldimethylammonium.bis(trifluoromethanesulfonyl)imide, and the like, and diallyldimethylammonium.bis-(trifluoromethanesulfonyl)imide is most preferable.

With respect to the solubility in water, easy water-solubility refers to the case in which an ionic substance is easily dissolved in water when water and the substance are mixed in equal amounts at ordinary temperatures. Examples thereof include lithium.bis(trifluoromethanesulfonyl)imide, which is a lithium salt, 1-butyl-3-methylpyridin-1-ium.trifluoromethanesulfonate and 1-ethyl-3-methylimidazolium.tetrafluoroborate, which are ionic liquid, and the like. Furthermore, the case in which a substance separates into phases after mixing and being left to stand is defined as being water-insoluble, and the case in which a substance becomes turbid white and does not dissolve is defined as being poorly water-soluble.

The blending amount of the component (B) is from 0.05 to 1000 ppm. When the amount is less than 0.05 ppm, sufficient antistatic effects cannot be obtained, whereas when an amount of more than 1000 ppm is blended, there arise problems that the effects reach saturation, and the properties inherent to the silicone rubber cannot be maintained and, moreover, this situation is not commercially viable. The particularly preferable blending amount is 100 ppm or less.

In the present invention, in order to easily allow the uniform mixing of the polyorganosiloxane, in particular dimethylpolysiloxane generally used for commercial applications with the ionic substance having poor compatibility therewith, in particular the ionic substance which easily bleeds from the system, and further to stably keep the ionic liquid in the polyorganosiloxane matrix, thereby maintaining the effect over an extended period of time, it is preferable to further add a (C) perfluoroalkyl group-containing polyorganosiloxane in amounts of 0.001 to 10 parts by weight (relative to 100 parts by weight of the component (A)).

As the component (C), the perfluoroalkyl group-containing polyorganosiloxane, any polyorganosiloxane containing a perfluoroalkyl group may be used, and polyorganosiloxanes having at least one methyltrifluoropropylsiloxy unit are commercially known. The number of perfluoroalkyl groups bound to silicon atoms in the component (C) is 50% or less and, both in order to achieve a good balance between the compatibility with the component (A) and the retention of the component (B) in the siloxane matrix over an extended period of time to thereby maintain the curing, the number of perfluoroalkyl groups is preferably from 2 to 30%, more preferably from 7 to 20%.

Although the component (C) may be any of linear, cyclic and branched configurations, the linear ones are common, and they may have hydroxyl groups or alkoxyl groups at their terminal groups. The viscosity thereof is preferably lower than 100000 cSt, more preferably lower than 1000 cSt. When the viscosity is higher than 100000 cSt, the difference in viscosity from the component (B) is too big, thus resulting in difficulty in easy mixing.

In particular, it is preferable to prepare a mixture obtained by the mixing of the (C) perfluoroalkyl group-containing polyorganosiloxane and the ionic substance as the component (B) at a rate of 0.1 to 50%, and then to perform the addition.

Further, in preferable aspects of the present invention, the component (B) as the ionic substance, or the mixture of the component (B) and the component (C) supported on the reinforcing silica, exists in the composition, whereby the component (B) can easily disperse in the composition, and retention thereof in the system is improved.

Since the heat-curable silicone rubber composition of the invention has an excellent transparency, it is suitably used as covers for portable music players, portable game machines, cell phones and controllers of game machines; silicone rubber molds used for producing duplicates by using a urethane resin; and silicone rubber coatings used for coating clothes, and the like.

EXAMPLES

The present invention will be described in more detailed by means of Examples below.

Example 1

30 parts of dry silica (manufactured by Nippon Aerosil Co., Ltd.) having a specific surface area of 150 m$^2$/g, and 3 parts of polydimethylsiloxane (average degree of polymerization: 10) having terminal silanol groups were mixed with 100 parts of a vinyl group-containing polydimethylorganosiloxane having an average degree of polymerization of 5000, and having 0.20% by mole of methylvinylsiloxane units, and the mixture was heat-mixed over two hours at 150° C. to thereby obtain a silicone rubber base compound. Next, 10 ppm of N-butyl-3-methylpyridinium.bis(trifluoromethanesulfonyl)imide, which was water-insoluble, had a decomposition temperature of 290° C., and was liquid at ordinary temperatures, and 0.02 part of dry silica (manufactured by Nippon Aerosil Co., Ltd.) having a specific surface area of 150 m$^2$/g were added to 100 parts of the base compound, which was carried by the filler and was then mixed. After that, 1.0 part of a vulcanizing agent (TC-8 in which 2,5-dimethyl-2,5-di-t-butylperoxyhexane was contained in a content of 50%, manufactured by Momentive Performance Material Japan Inc.) was added thereto, and the mixture was subjected to press-vulcanization for 10 minutes at 170° C., and then oven-vulcanization (secondary vulcanization) for 4 hours at 200° C. to thereby obtain a rubber sheet for measuring properties.

Example 2

A rubber sheet was obtained in the same manner as in Example 1, except that 1-butyl-1-methylpyrrolidinium.bis-(trifluoromethanesulfonyl)imide, which was water-insoluble, had a decomposition temperature of 420° C. and was liquid at ordinary temperatures, was used instead of N-butyl-3-methylpyridinium.bis(trifluoromethanesulfonyl)imide.

Example 3

A rubber sheet was obtained in the same manner as in Example 1, except that diallyldimethylammonium.bis(trifluoromethanesulfonyl)imide, which was poorly water-soluble, had a decomposition temperature of 270° C. and was liquid at ordinary temperatures, was used instead of N-butyl-3-methylpyridinium-bis(trifluoromethanesulfonyl)imide.

Comparative Example 1

A rubber sheet was obtained in the same manner as in Example 1, except that N-butyl-3-methylpyridinium.bis(trifluoromethanesulfonyl)imide was not added.

Comparative Example 2

A rubber sheet was obtained in the same manner as in Example 1, except that 100 ppm of lithium.bis(trifluoromethanesulfonyl)imide, which was easily water-soluble, had a decomposition temperature of 380° C. and was solid at ordinary temperatures, was used instead of N-butyl-3-methyl-pyridinium.bis(trifluoromethanesulfonyl)imide.

Comparative Example 3

A rubber sheet was obtained in the same manner as in Example 1, except that 1-butyl-3-methylpyridin-1-ium trifluoromethanesulfonate, which was easily water-soluble, had a decomposition temperature of 260° C. and was liquid at ordinary temperatures, was used instead of N-butyl-3-methylpyridinium-bis(trifluoromethanesulfonyl)imide.

Comparative Example 4

A rubber sheet was obtained in the same manner as in Example 1, except that 1-ethyl-3-methylimidazolium-tetrafluoroborate, which was easily water-soluble, had a decomposition temperature of 350° C., and was liquid at ordinary temperatures, was used instead of N-butyl-3-methylpyridinium.bis(trifluoromethanesulfonyl)imide.

Example 4

A solution of 1% of N-butyl-3-methylpyridinium.bis(trifluoromethanesulfonyl)imide, which was poorly water-soluble, had a decomposition temperature of 290° C. and was liquid at ordinary temperatures, dissolved in 100 parts of a perfluoroalkyl group-containing polyorganosiloxane (a linear polymer made up of 30% by mole of methyltrifluoropropyl group siloxy units, with the rest being dimethylsiloxy units, and having hydroxyl groups at both terminals), having a viscosity of 150 cSt was prepared. A rubber sheet was obtained in the same manner as in Example 2, except that 0.1 part of this solution was added instead of N-butyl-3-methylpyridinium.bis(trifluoromethanesulfonyl)imide.

Example 5

A rubber sheet was obtained in the same manner as in Example 4, except that fluorosilicone oil made up of 100% methyltrifluoropropyl units having hydroxyl groups at both terminals and having a viscosity of 430 cSt was used instead of the perfluoroalkyl group-containing polyorganosiloxane having a viscosity of 150 cSt (the linear polymer made up of 30% by mole of methyltrifluoropropyl group siloxy units, with the rest being dimethylsiloxy units, and having hydroxyl groups at both terminals).

Example 6

A rubber sheet was obtained in the same manner as in Example 4, except that diallyldimethylammonium.bis(trifluoromethanesulfonyl)imide was used instead of the N-butyl-3-methylpyridinium-bis(trifluoromethanesulfonyl)imide. Physical properties of the obtained rubber sheets were evaluated according to criteria described below. The results are shown in Table 1.

(Charged Voltage Half-Life)
After a test specimen was charged by 6 KV-corona discharge, the change in charged voltage was measured through the use of Shishido Static Honestmeter H-0110 manufactured by Shishido Electrostatic, Ltd.

(Volume Resistivity)
Volume resistivity was measured in accordance with JIS K 6249, and through the use of HIGH RESISTANCE METER 4329A manufactured by YOKOGAWA-HEWLETT-PACKARD. In Table 1, "1E15" means $1 \times 10^{15}$.

(Surface Resistance (at an Initial Stage))
Surface resistance was measured through the use of HIGH RESISTANCE METER 4329A manufactured by YOKOGAWA-HEWLETT-PACKARD at 10 minutes after producing the rubber sheet.

(Time Stability Test)
The appearance (coloration) of the sheet was evaluated visually at one week after producing the sheet, and the charged voltage half-life and the volume resistivity were measured in the same manner as the above.

(Environmental Test)
The environmental test was performed through the use of a Sunshine Weather-O-Meter under test conditions stated in JIS A 1439. Sunshine Super Long Life Weather-O-Meter (Type: WEL-SUN) manufactured by Suga Test Instruments Co., Ltd. was used as the test instrument, 500-hour exposure and 1000-hour exposure were performed, and then the charged voltage half-life and the volume resistivity were measured.

Table 1

TABLE 1

|  | Examples | | |
|---|---|---|---|
|  | 1 | 2 | 3 |
| N-butyl-3-methylpyridinium•bis(trifluoromethanesulfonyl)imide | 10 ppm | | |
| 1-butyl-1-methylpyrrolidinium•bis(trifluoromethanesulfonyl)imide | | 10 ppm | |
| diallyldimethylammonium•bis(trifluoromethanesulfonypimide | | | 10 ppm |
| lithium•bis(trifluoromethanesulfonylimide) | | | |
| 1-butyl-3-methylpyridin-1-1umlithium•bis(trifluoromethanesulfonylimide)trifluoromethanesulfonate | | | |
| 1-ethyl-3-methylimidazolium•tetrafluoroborate | | | |
| perfluoroalkyl group-containing polyorganosiloxane (30% by mole of methyltrifluoropropyl group siloxy units, hydroxyl groups at the both terminals) having a viscosity of 150 cSt | | | |
| fluorosilicone oil made up of 100% methyltrifluoropropyl units and hydroxyl groups at the both terminals, having a viscosity of 430 cSt | | | |
| The sheet was produced, it was subjected to a secondary vulcanization for 4 hours at 200° C., and the measurement was performed after 10 minutes. | | | |
| Charged voltage half-life (second) | 3 | 2 | 3 |
| Volume resistivity (Ω · cm) | 7E+13 | 6E+13 | 7E+13 |
| Surface resistance (Ω) | 4E+14 | 3E+14 | 3E+14 |

TABLE 1-continued

|  | Examples | | |
|---|---|---|---|
|  | 1 | 2 | 3 |
| (Change with time) At one week after the production of the sheet | | | |
| Appearance | Semi-transparent | Semi-transparent | Semi-transparent |
| Charged voltage half-life (second) | 3 | 2 | 3 |
| Volume resistivity (Ω · cm) | 7E+13 | 6E+13 | 7E+13 |
| (Environmental test) After 500 hours | | | |
| Charged voltage half-life (second) | 7 | 7 | 5 |
| Volume resistivity (Ω · cm) | 9E+13 | 9E+13 | 8E+13 |
| (Environmental test) After 1000 hours | | | |
| Charged voltage half-life (second) | 9 | 9 | 7 |
| Volume resistivity (Ω · cm) | 2E+14 | 2E+14 | 1E+14 |

The invention claimed is:

1. A heat-curable silicone rubber composition, prepared by adding 10 to 100 ppm of (B) a poorly water-soluble or water-insoluble ionic liquid having bis(trifluoromethanesulfonyl) imide as an anionic component, is in the liquid state at an ordinary temperature of 23° C. and has a decomposition temperature of at least 220° C. to 100 parts by weight of (A) a heat-curable silicone rubber wherein the component (B) is selected from the group consisting of 1-butyl-3-methylimidazolium.bis(trifluoromethanesulfonyl)imide, 1,2-dimethyl-3-propylimidazolium.bis(trifluoromethanesulfonyl)imide, 1-ethyl-3-methylimidazolium.bis(trifluoromethanesulfonyl) imide, 3-methyl-1-propylpyridinium.bis(trifluoromethanesulfonyl)imide, N-butyl-3-methylpyridinium.bis(trifluoromethanesulfonyl)imide, 1-butyl-1-methylpyrrolidinium.bis(trifluoromethanesulfonyl)imide, 1-vinylimidazolium.bis(trifluoromethanesulfonyl)imide, 1-allylimidazolium.bis(trifluoromethanesulfonyl)imide, 1-allyl-3-methylimidazolium.bis(trifluoromethanesulfonyl) imide and diallyldimethylammonium.bis(trifluoromethanesulfonyl)imide.

2. The heat curable silicone rubber composition according to claim 1, wherein the component (B) is N-butyl-3-methylpyridinium.bis(trifluoromethanesulfonyl)imide.

3. The heat curable silicone rubber composition according to claim 1, wherein the component (B) is 1-butyl-1-methylpyrrolidinium.bis(trifluoromethanesulfonyl)imide.

4. The heat curable silicone rubber composition according to claim 1, wherein the component (B) is diallyldimethylammonium.bis(trifluoromethanesulfonyl)imide.

5. The heat-curable silicone rubber composition according to claim 1, wherein the ionic liquid as the component (B) has at least one alkenyl group as a cationic ion.

6. The heat-curable silicone rubber composition according to claim 1, further comprising (C) a perfluoroalkyl group-containing polyorganosiloxane, which is added in amounts of 0.001 to 10 parts by weight relative to 100 parts by weight of the component (A).

7. A transparent silicone rubber obtained from the heat-curable silicone rubber composition according to claim 1.

8. A heat-curable silicone rubber composition, prepared by adding 10-100 ppm of (B) a poorly water-soluble or water-insoluble ionic liquid having bis(trifluoromethanesulfonyl) imide as an anionic component and a cationic component selected from the group consisting of a pyridinium cation, a pyrrolidinium cation and an ammonium cation, is in the liquid state at an ordinary temperature of 23° C. and has a decomposition temperature of at least 220° C. to 100 parts by weight of (A) a heat-curable silicone rubber.

9. The heat-curable silicone rubber composition according to claim 8, wherein the component (B) is selected from the group consisting of N-butyl-3-methylpyridinium.bis(trifluoromethanesulfonyl)imide 1-butyl-1-methylpyrrolidinium-.bis(trifluoromethanesulfonyl)imide and diallyldimethylammonium.bis(trifluoromethanesulfonyl)imide.

* * * * *